July 21, 1970   J. C. SIMS, JR   3,521,381
TEACHING MACHINE AND INFORMATION CARD THEREFOR
Filed April 26, 1968   4 Sheets-Sheet 1

INVENTOR
JOHN C. SIMS, JR.

BY

ATTORNEY

INVENTOR
JOHN C. SIMS, JR.

United States Patent Office 3,521,381
Patented July 21, 1970

3,521,381
TEACHING MACHINE AND INFORMATION CARD THEREFOR
John C. Sims, Jr., Sudbury, Mass., assignor to Information Transfer Corp., Wellesley, Mass., a corporation of Massachusetts
Filed Apr. 26, 1968, Ser. No. 724,462
Int. Cl. G09b 7/08
U.S. Cl. 35—9                                                14 Claims

ABSTRACT OF THE DISCLOSURE

Teaching cards are provided, each of which includes a first area bearing viewable information, a second area bearing reproducible audio tracks, and a third area bearing printed circuit control information. A stack of such cards are fed into a teaching machine in sequence for student viewing of said first areas. The control information on each card completes a control circuit in the machine uniquely related to the viewable and reproducible information on that card. The machine includes plural switches adapted to be selectively activated by a magnetic pointer manipulated by the student, for reproducing appropriate audio tracks on a card being viewed, and for controlling the subsequent feeding of a further card into viewing position, as determined by control information on the card being viewed.

BACKGROUND OF THE INVENTION

The present invention relates to a system for the presentation of audio-visual information to a student, for the purpose of teaching, and further for sensing student responses to the presented information as a criterion for determining the specific audio-visual information to be presented subsequent to each student response. In the past, devices and systems have been proposed and constructed for the purpose of instruction, ranging in complexity from magnetic tape players and photographic slide projectors to computer operated audio-visual consoles. The existing approaches all exhibit limitations or disadvantages with respect to either performance or cost.

The most advanced systems utilize a digital computer having a program for operation and control of various presentation devices. For example, a computer aided instruction system may utilize a slide projector as a peripheral device in which the computer program can select the sequence of slides to be presented. The program can also operate, as another peripheral, a disc or drum audio file having recordings of sound or spoken messages. In such a system, visual and audio information can be presented to a student as a lecture and the student is then asked appropriate questions. The student responds, typically, by depressing keys or buttons to communicate his choice to the computer. The computer program determines whether or not the response was correct, and on this basis then either presents remedial instruction or proceeds to a new subject. This operation is known as branching.

The instructional method described above, as carried out by a computer, is known as "programmed instruction." This method is similar to that used by a teacher in providing individual instruction to a student. When individual, as opposed to group, instruction is provided, the student proceeds at his own pace or speed, receiving information one item at a time, being queried to determine whether or not he has understood or learned the item after each presentation. When the student responds correctly, the teacher congratulates him and proceeds to the next item. When the response is incorrect, the teacher points out the error and then explains the item again in such a way as to help the student to comprehend or learn the item. In general, programmed instruction carried out by a computer involves a system of such cost and complexity as to severely limit its practicality as a teaching aid in most school systems, or as a private tutoring aid for an individual student.

Programmed instruction has also been used to some extent, in smaller teaching machines which are simpler in design than computer systems, and which are intended for more economical and wider scale usage as teaching aids. These known simpler machines ordinarily use slides or film strips for projecting pictures on a small screen, tape players for audio, and buttons for student response. Some such machines have been provided with a limited logic or control capability by means of an electrical plugboard. Known teaching machines of these types are primarily assemblages of separate audio, visual, and control devices which are intended to act together in a composite system performing the needed functions. One difficulty in such "assembled" systems has been the need for proper synchronization of the separate audio and visual devices used, to assure that the proper sound track is played with each slide. A further difficulty in such systems arises from their use of "projected" images, which cannot be viewed under high ambient light conditions. Another disadvantage in such systems arises from their use of film media which, in most cases, present pictures with an approximately square aspect ratio; whereas the bulk of existing instructional material is in book form having page dimensions of either 8½" x 11" or 5½" x 8½". To adapt existing material for such film presentation thus requires complete recomposition of each page, a very costly procedure; and costs are further increased by the fact that film is a more expensive media than printed paper.

A very serious limitation in existing devices of the types described above, arises from their use of a keyboard or group of buttons for student response. The student must accordingly perform both an association and an abstraction in order to respond. For example, a student may be shown a picture having five items on it. Elsewhere, the machine may be provided with five buttons. In order to respond, the student must associate each item on the picture being viewed with a corresponding button on the machine. The separation of the buttons from the picture being presented creates an abstractive situation. The ability to abstract and to associate is generally absent in the very young, and is typically poor in students having learning difficulties. Furthermore, the use of buttons for response, with the association requirement, means that, at least in a limited sense, the student must be able to read in order to respond. The use of response buttons in any teaching system accordingly makes the system inappropriate for use in instruction below the fourth grade level.

Thus, multi-media machines, that is, those using separate audio and visual records and, where it is provided, a further separate control system in the form of a computer program, plugboard and the like, not only have media synchronization problems, but also require multiple and expensive processes for preparation of the necessary media, and have other practical disadvantages such as those described above.

It is therefore a first object of this invention to provide, on a single medium, all the information required for audio-visual presentations and program control. It is a further object of this invention to provide an improved instruction system which does not require synchronization of independent media. It is another object to provide an instruction system of substantially lower cost than equivalent existing systems. A further object resides in the provision of teaching media which can be produced by a single process, e.g., printing. Another object is to provide a relatively simple but highly effective instruction system in which the material presented, and the order of its presentation, is determined by the student responses. These and other objects will become apparent from the following description.

SUMMARY OF THE INVENTION

The present invention makes particular use of a new medium or instruction card arrangement. The card comprises a completely printed format which is divided into three generalized areas. The front of the card, or first generalized area, is roughly of book plate size, and has one or more visual images printed thereon. On the rear of the card, in a second generalized area, a plurality of audio tracks are printed carrying messages related to the visual image or images printed on the front of the card, or first generalized area. The rear of the card further contains a third generalized area bearing logical control information comprising, for example, a printed circuit pattern.

A deck of cards of the type described are associated with a teaching machine, and are fed one at a time into said machine. When each such card is fed from an input stack into the machine, the first generalized area on said card is exposed to direct view by the student, thereby eliminating difficulties arising from the projection of images. Each card, when in proper position in the machine for viewing, has its second generalized area, or audio track area, disposed adjacent an appropriate movable transducer in the machine; and the third generalized area, or control region, of the card, is simultaneously positioned adjacent a series of brushes in the machine cooperating with logical circuitry forming a portion of the machine. In this manner, the control information on each card controls the reproduction of one or more of the audio tracks on said card, and also controls the feeding of the card through the machine to an output stack and its replacement by another card from the input stack of cards.

The cards may be of two general types, i.e., "lecture" cards and "response" cards. Lecture cards may bear, in their first generalized area, an illustration appropriately related to an audible lecture which is printed on the sound tracks of that card. Such a lecture card bears control information in its third generalized area adapted, when the lecture card is fed into the machine, to cause the several tracks on that card automatically to be reproduced in sequence, whereafter the card is replaced by a next card from the input stack.

Each "response" card, on the other hand, may present a multiple choice situation for testing the student. Such response cards have the various choices printed at specified locations on the card, which specified locations overlie a related array of magnetically operable switches within the teaching machine. The control information printed on each such response card informs the machine just which of the several possible choices on the card is correct, and further sets up appropriate logic for reproducing a track on the card to inform the student of the test procedure, and to inform the machine as to the action it should take if the student makes a correct response, or the different action it should take if the student makes an incorrect response. The student response is effected by having the student touch a magnetized pointer to the selected item on the response card; and this touching closes one of the underlying array of magnetic switches in the machine to institute an appropriate control sequence determined by the control circuits on the card then being viewed.

In a typical sequence of operation, cards are fed successively from an input stack in the teaching machine into a viewing position. When each card is in position, an audible message is automatically reproduced from at least one of the audio tracks on said card to give a message to the student. The first card, or first several cards, in a given stack of cards will usually present information in the form of an illustrated lecture; and each such lecture card will appear before the student while the audible message on that card is played, whereafter the lecture card in question is removed to an output stack and is replaced by a further card from the input stack. At the conclusion of the lecture, the next following card will normally be a response card presenting a multiple choice question; and this response card will remain stationary in front of the student until he responds. To respond, the student points a permanently magnetized pointer or wand at a selected picture, word or sentence on the response card; and the machine senses the presence of the magnetic field of the pointer at the particular choice point. The electronic logic of the machine, operating under the control of information printed on the back of the card, determines whether the choice was correct or incorrect, causes a further audio message to be played to either congratulate the student for a correct choice (sometimes called "positive reinforcement"), or reproduces a different audio message to admonish the student for his error (sometimes called "negative reinforcement"). The response card is then automatically fed to the output stack and replaced by a further card from the input stack. The further card so presented to the student may be the next card in sequence from the stack, presenting remedial information to the student in the event that his earlier choice was in error; or, if the student's choice was correct, the machine may pass over a number of cards in the input stack and branch to a card farther along in the stack to present a new subject.

The program normally proceeds in the manner described, presenting material one subject at a time and testing the student before proceeding to the next subject. When the student responds in error, remedial material is presented and the student is re-tested. When the student responds correctly, the program skips over the remedial material to the start of the next subject.

By use of the card system described, and particularly by reason of the fact that each card contains logical control information related to the information on said card, there is no fixed operational significance to any choice point on a given response card. Any of the several choice points can signify a correct response, and the location of the "correct" choice point can vary from one response card to the next. There can, indeed, be more than one type of correct response, and more than one type of incorrect response; and each such type of response may activate the logic of the system to initiate a different sequence of operations. By use of different control patterns on different cards, the machine is automatically capable of sensing which cards in the stack are "lecture" cards, and which cards are "response" cards, and automatically initiates the necessary sequence of control operations appropriate for each type of card. As a result, once a stack of cards is placed in the machine and the teaching cycle initiated, the complete teaching sequence can proceed automatically from the first card to the last without requiring any supervisory attention.

DESCRIPTION OF THE PREFERRED EMBODIMENTS

Referring initially to FIGS. 1 through 5 inclusive, it will be seen that a teaching machine constructed in accordance with the present invention comprises a housing 30 provided with a platform 31 on which may be stacked a plurality of teaching cards 32 each of which takes the form later to be described in reference to FIG. 6. The stacked cards 32 are positioned and aligned by means of posts 33 so as to register the lowermost card in said stack with an internal card feed mechanism of the type shown in FIGS. 2 and 3. This card feed mechanism, which will be described later, feeds cards into the machine for presentation, one by one, from the bottom of the stack 32. As each card is fed into the machine, it is moved into a predetermined position such that a visual picture or other visual information printed on the upper side of the card appears in a window 34 for direct viewing.

Figure 1:
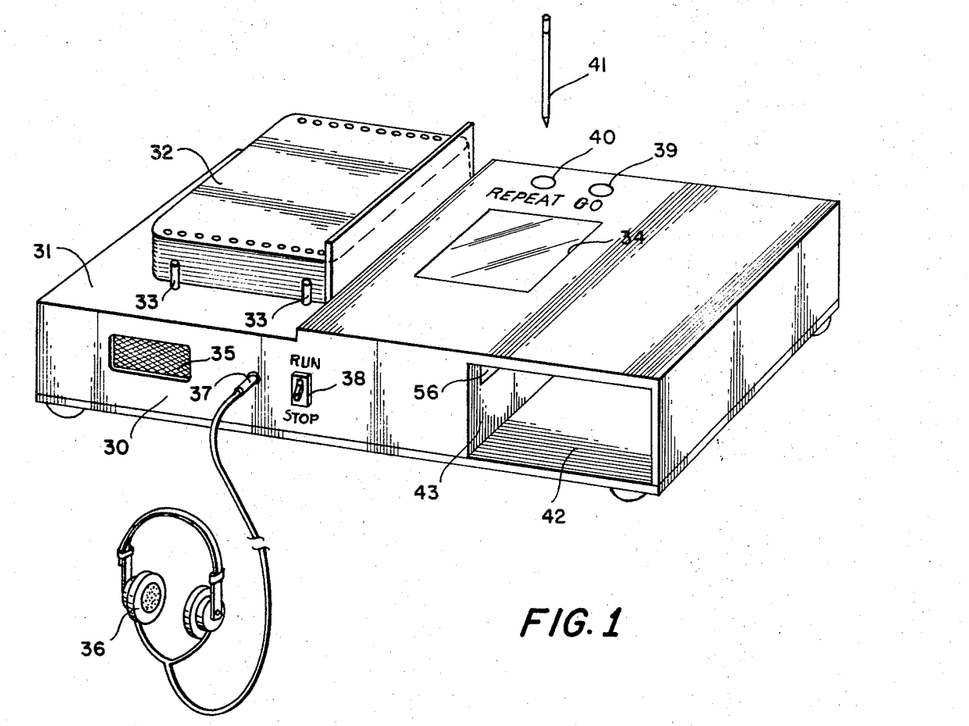
FIG. 1 is a diagrammatic perspective view of a teaching machine constructed in accordance with the present invention.

As will appear hereinafter, each card contains reproducible audio tracks; and the information on these tracks, when reproduced, may be heard by the student through a speaker 35, or by means of head phones 36 removably plugged into the machine 37. The machine includes a "run-stop" switch 38, and also includes magnetically responsive switch points 39 and 40 adapted to cooperate with a magnetized pointer 41 manipulated by the student to permit the student to commence the feeding of cards when desired ("Go" point 39) or to repeat a message on a particular card (point 40). As each card is fed out of the viewing position provided by window 34 it passes on to a further shelf 42 to form an output card stack; and the stacked output cards can be removed as desired via opening 43.

Figure 2:
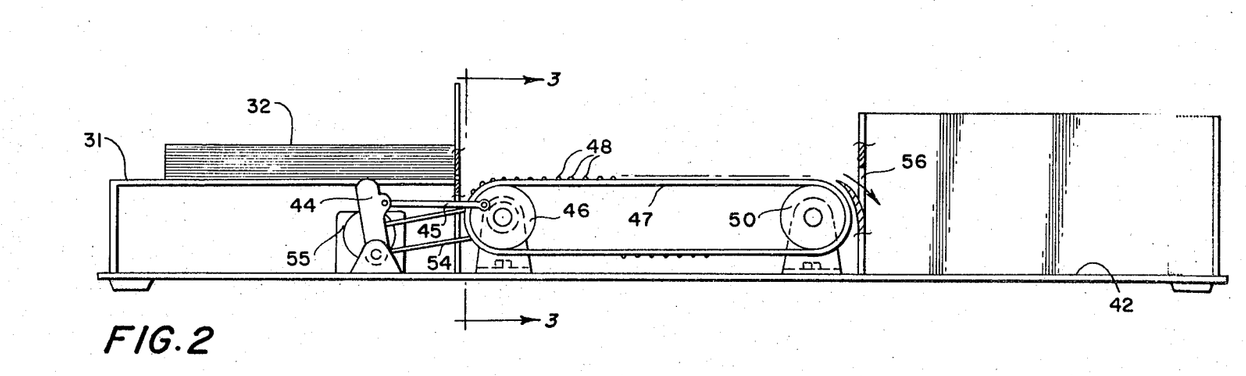
FIG. 2 is a cross-sectional side view of the machine of FIG. 1.
Figure 3:
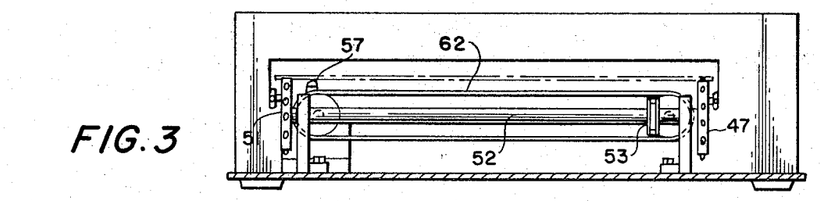
FIG. 3 is a view taken on line 3—3 of FIG. 2.

As best shown in FIG. 2 the several cards 32 are fed from the input stack by a reciprocating picker knife 44 driven by a crank 45 extending to a drive wheel 46. The size of the drive wheel 46 is chosen so that its circumference is somewhat greater than the length of a card. Drive wheel 46 drives a belt 47 having sprocket pins 48 thereon adapted to engage cooperating apertures 49 extending along opposing edges of each card 32 (see FIG. 6). Belt 47 passes over an idler wheel 50. A similar drive arrangement is provided by means of a further sprocket belt 51 (see FIG. 3) mounted on a further drive wheel and idler wheel analogous to elements 46 and 50; and the drive wheels so provided may be interconnected by a shaft 52 carrying a pulley 53 thereon for drive through belt 54 from a card drive motor 55. Motor 55 is energized at appropriate times in accordance with the logic subsequently to be described in reference to FIG. 7 so as to effect rotation of the drive wheels, and translation of bel ts 47 and 51. Each time the drive wheels make one revolution, the bottom card in the input stack is extracted and fed out to engage the sprocket pins on the belts 47, 51 which in turn transport the card to the viewing position. As each new card is extracted and fed into position, the card previously in viewing position is fed through a slot 56 onto the output stack shelf 42.

The teaching machine further includes a head assembly 57 comprising a plurality of heads adapted to be translated together along a guideway 58 extending substantially parallel to shaft 52. As shown diagrammatically in FIGS. 3 and 4, head assembly 57 cooperates with a pair of limit switches 59 and 60, and with a reversible head drive motor 61 operative to drive a cable or belt 62 in one direction or the other to move head 57 between two limit positions corresponding to the so-called "home" and "away" positions. As will appear hereinafter, head assembly 57 comprises a plurality of heads adapted to cooperate individually with a plurality of reproducible audio tracks 66 (FIG. 6) on the lower side of each card 32; and once a card is in position, the head assembly 57 can be translated in an appropriate direction, and the appropriate one of the heads in said assembly can be activated, to permit reproduction of a particular track, or several tracks in sequence, on the card. This operation is controlled by selectively energizing reversible head drive motor 61 through the logic subsequently to be described in reference to FIG. 7.

Figure 6:
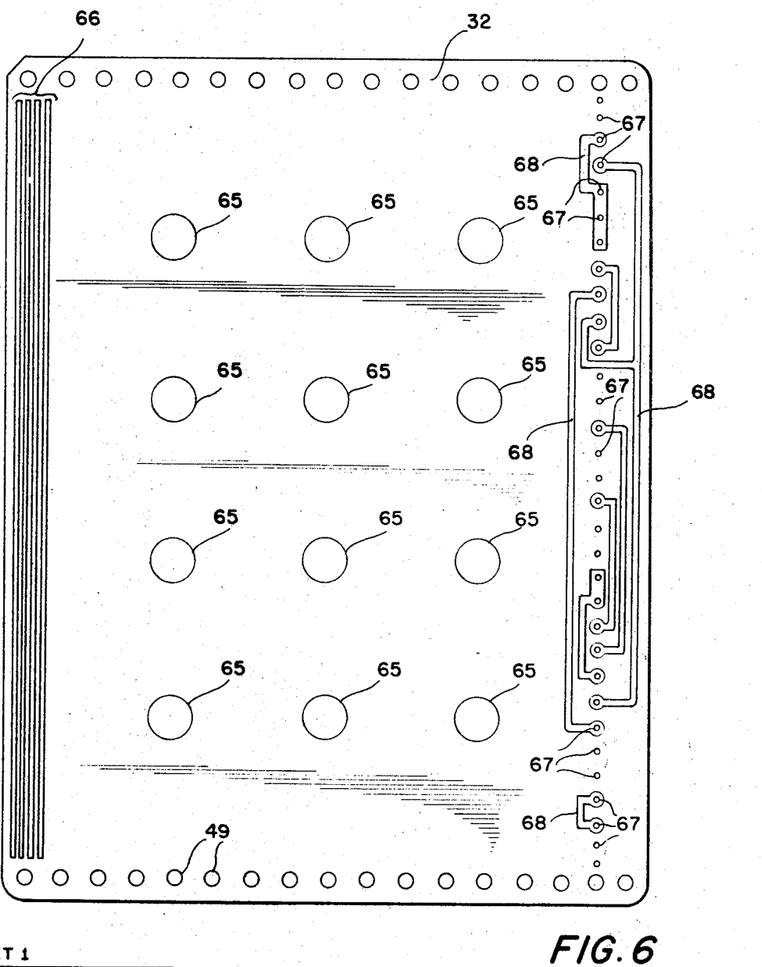
FIG. 6 is a view of the under side of a teaching card constructed in accordance with the present invention.

As shown in FIG. 6, each card 32 is fabricated of an opaque paper stock and is divided into three generalized areas. The overall dimensions of the card are roughly 11 inches in width by 8½ inches in length; and the uppermost surface of the card is provided with a central area of roughly 5½ inches by 8½ inches on which one or more visual images or items can be printed. The size of this first generalized area is essentially the same as the half letter size used for book plates; and the choice of this size allows existing educational, textural, and illustrative materials printed in books to be printed directly on the several instruction cards wtihout any recomposition. The material so printed on the upper surface of the card can be disposed anywhere on that surface, and can cover the entire surface in the case of a so-called "lecture" card. In order to permit the card to be used for "response" purposes, the first generalized area of the card is divided into twelve areas related respectively to a three by four array of "touch points" 65. As will appear hereinafter, this array of touch points 65 is positioned to overlie a similar array of magnetic reed switches within the machine, when the card is properly in place. As a result, a student, by touching a selected one of the points 65 with a magnetic pointer, may close an underlying switch in the machine to inform the machine, through the logic of FIG. 7, of the student choice, whereupon the machine may take appropriate further action dictated by the nature of this choice.

A plurality of audio tracks 66 are printed in a second generalized area on the lower surface of the card, and these tracks 66 carry messages appropriately related to the visual material printed in the first generalized area on the upper surface of the card. If the visual material is simply an illustration or the like presented for lecture purposes, the audio printed on sound tracks 66 will normally describe and discuss the illustrated material. On the other hand, if the visual material on the upper surface of the card presents a multiple choice situation, the audio tracks normally include one track bearing information explaining to the student just how to respond to the multiple choice situation. When the student responds by pointing the magnetic pointer 41 toward a selected touch point 65, the particular point so chosen is sensed by the teaching machine and an appropriate other one of the tracks is then played. If the student's choice is correct, the track selected for reproduction gives a "positive reinforcement." If the student choice is incorrect, however, a different audio message is reproduced from a different one of the tracks to give a negative reinforcement. In a response card, a minimum of three separate messages or audio tracks are thus provided, i.e., a first, or entry, track is provided presenting the question to be answered; and at least two exit tracks are provided, one carrying a positive reinforcement message and the other carrying a negative reinforcement message. In the particular form of card shown in FIG. 6, four tracks are provided so that more than one type of negative reinforcement message can be given for different kinds of incorrect responses.

The audio tracks 66 in the second generalized area on the lower side of the card 32 are printed in a printing press. Each track is preferably a variable area visual replica of the audio wave forms to be reproduced. Such variable area recording is, in itself, well known particularly in the motion picture field. A sound track of this kind, recorded on film, is used to prepare a printing plate and the image of the desired audio messages is then printed on the card. The audio information can be reproduced by well known optical scanning methods used in connection with film records or, in the alternative, the tracks can be printed with a magnetic ink, in which event magnetic reading heads can be used for reproduction purposes. Such variable area printed magnetic tracks are also well known, and are described for example in Bender U.S. Pat. No. 3,289,326. The magnetic type of track is preferred in the present invention since magnetic sound reproduction heads are less expensive and more reliable than typical optical reading systems.

It will be appreciated, of course, that when the card is properly positioned in window 34 (FIG. 1) the several tracks 66 overlie head assembly 57. Magnetic tracks of the types contemplated by the present invention can be reproduced at the rate of approximately one inch per second, and as a result each track can contain approximately a ten-second message. When all four tracks are played in sequence for lecture purposes, the lecture on the given card can thus occupy approximately a 40-second time interval.

The card 32 shown in FIG. 6 contains, on its underside, a third generalized area bearing logical control information. More particularly, this third generalized area may be provided with a large plurality of aligned brush points 67 each of which is intended to overlie an individual brush in a brush array 74 (FIG. 5) when the card is in proper position in the teaching machine. Different ones of the brush points 67 can be interconnected by conductive printed circuit deposits of the types generally designated 68 so that, when the card is properly in position, circuits are completed between selected ones of the brushes in the machine. These connections which are completed when the card is fed into proper position define, for the teaching machine, the nature of the card then in position the particular operation and sequence of operations to be performed the correctness or incorrectness of particular student responses if a testing procedure is in process etc. and in general determine the complete teaching cycle.

Because of the many variations which can be made in the arrangement of logical control information 68 there is no fixed operational significance to any touch point 65 on the card. In a typical response situation multiple choice information can be disposed adjacent any plurality of touch points 65 and any preselected point 65 can signify a correct response with the position of the "correct" response varying from one response card to the next. There can indeed be more than one type of correct response and more than one type of incorrect response; and each of these different types of response may be operative to set in motion a different sequence of control operations.

Furthermore the presence or absence of conductive deposit 68 between certain selected points 67 informs the machine whether the card then in viewing position is a lecture card or a response card. In the lecture mode of the system this control information causes all (or any desired one or more) of the sound tracks to be played in sequence whereafter the card is removed and replaced by the next card in the stack. In the response mode of the system however the control information thus provided causes only the first or entry sound track to be played whereafter the machine stops and waits until a choice point is activated after which some other sound track is played in dependence upon whether the student's answer was correct or incorrect and the card is then removed and replaced.

It will be noted that all of the information on card 32, including the visual information, audio information, and control information is printed. As a result, the card can be more readily and inexpensively fabricated and reproduced than has been the case in teaching cards in the past.

Figure 5:
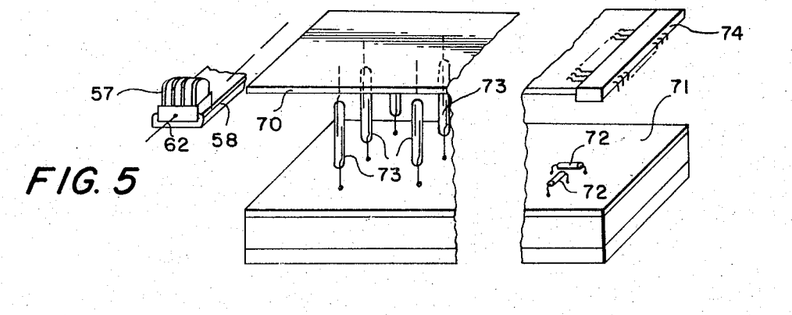
FIG. 5 is a diagrammatic perspective view of certain portions of the teaching machine.

FIG. 5 shows the physical arrangement of the student response unit and electronics subassembly. This subassembly is located under window 34 between belts 47, 51. The subassembly includes an upper printed circuit board 70, and a lower printed circuit board 71 either or both of which may have appropriate electrical and logical components 72 mounted thereon. A plurality of magnetic reed switches 73 extend between printed circuit boards 70 and 71, and these switches are positioned in accordance with the card touch point array 65 already described in reference to FIG. 6. Accordingly when a response card is properly in position, each of the touch points 65 (or selected ones of said touch points if all of them are not to be employed) overlie corresponding reed switches 73.

Magnetic reed switches 73 of the type contemplated herein are in themselves well known and commercially available, for example, from C. D. Clare & Co., under their designation Part No. RP–925D. When a reed switch of this sort is subjected to a magnetic field above a certain intensity, its contacts close to complete an electrical circuit; and when the field is removed the contacts reopen. By use of a reed switch array of the type shown in FIG. 5, cooperating with a touch point card array of the type already described in reference to FIG. 6, a response card may be fed into position overlying the uppermost printed circuit board 70 with the several touch points 65 in proper registry respectively with the several reed switches 73; and a student being tested may then effect an appropriate "choice" by moving a magnetic pointer such as 41 (FIG. 1) toward a selected touch point on the upper surface of the card thereby to close a particular reed switch 73.

As will be appreciated from FIG. 5, when a card 32 is in proper position overlying the reed switch array 73, its audio tracks 66 overlie the several heads in head assembly 57 so that, by moving heads 57 across the stationary card, a selected one or more of tracks 66 can be reproduced. Moreover, when the card is thus properly positioned for viewing, the card brush points 67 overlie a brush array 74. Each card is thus operative to complete a plurality of control circuits between selected brushes in said array 74 in dependence upon the printed circuit deposits 68 on the card then being viewed. This operates to inform the teaching machine as to the nature of the card then in viewing position, and sets up appropriate logical circuits defining actions and the sequence of actions which the machine is to take.

Figure 7:
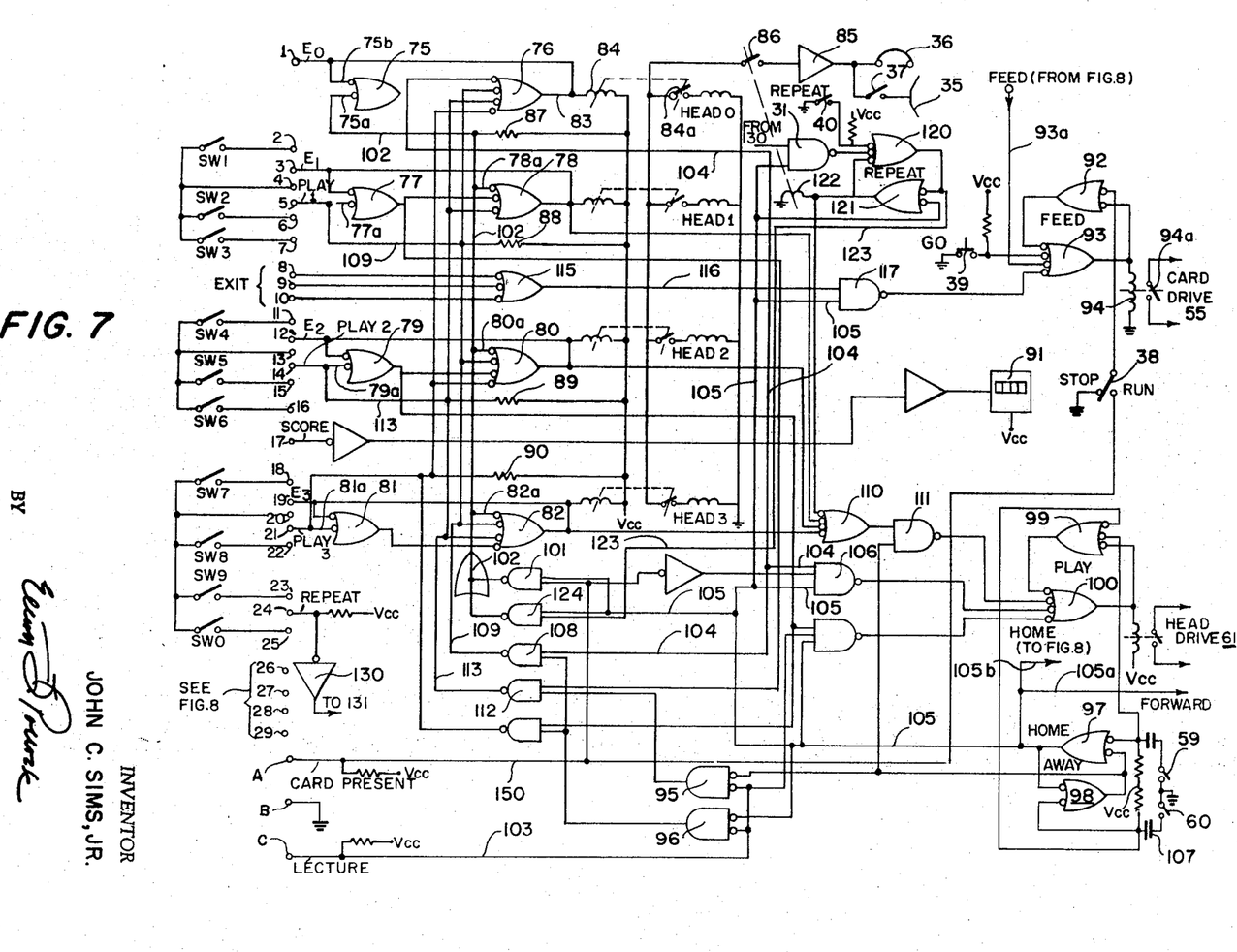
FIG. 7 is a schematic diagram showing the logic of the teaching machine of the present invention.
Figure 8:
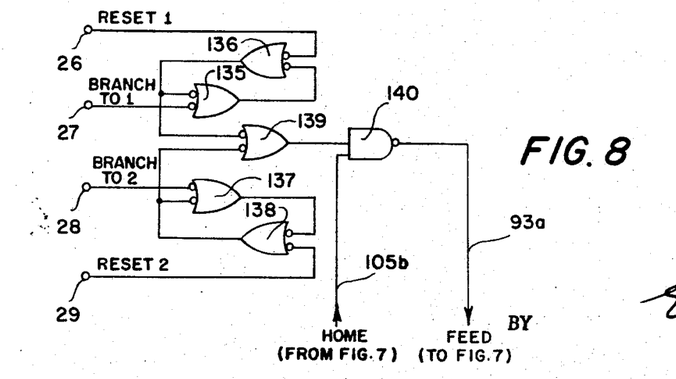
FIG. 8 is a schematic view of a further logic circuit used in the present invention for program branching.

One logical array constructed in accordance with the present invention is shown in FIGS. 7 and 8. It has been assumed that only ten reed switches 73 are utilized, and these switches have been designated SW1, SW2 . . . SW0. It has further been assumed that the machine includes a total of thirty-two brushes designated 1–29 inclusive, A, B, and C; and these thirty-two brushes are connected to logical components in the machine, and to the reed switches, in the manner illustrted in FIGS. 7 and 8. The thirty-two brushes diagrammatically illustrated in FIG. 7 are adapted respectively to engage a like plurality of brush points 67 on card 32 when the card is in proper viewing position; and the actual circuits which are completed in the logic of FIGS. 7 and 8 , and the functions to be performed by the system, depend upon just what printed circuit deposits are present on a given card 32 between the several brush points 67, and their location. It must be noted in this respect that the particular printed circuit array shown on the card of FIG. 6 is intended to be illustrative only and has no direct correlation to the brush array shown in FIG. 7.

The logic system shown in FIGS. 7 and 8 is implemented by use of standard digital logic elements of the type manufactured by Sprague Electric Company, Concord, N.H., as their 7400 series integrated circuits. The logic symbols employed in FIGS. 7 and 8 correspond to Military Standard 806–B. In the following description of the system shown, "logic 1" is a positive voltage, and "logic 0" is either zero volts or a negative potential.

Thirteen brushes are associated with the ten reed switches SW1 . . . SW0 (comprising switches 73 of FIG. 5). Brush 2 is connected to reed switch SW1, brush 6 is connected to reed switch SW2, etc. The group of switches SW1, SW2, and SW3 have a common return junction connected to brush 4. Similarly, switches SW4, SW5 and SW6 are grouped together and returned to brush 13; and switches SW7, SW8, SW9 and SW0 are grouped together and returned to brush 20. The other brushes shown in FIGS. 7 and 8 have been labeled to indicate their functions. For example brush 1 has been labeled $E_0$ and indicates the presence of a logic 0 signal corresponding to the set condition of an input flip-flop comprising NAND elements 75 and 76. Brushes 3, 12, and 19, labeled $E_1$, $E_2$ and $E_3$ respectively, perform similar functions with respect to other input flip flops. Brush A, cooperating with grounded brush B, determines whether a card is present in the reading position. Brush C, cooperating with grounded brush B, determines whether a card in the reading position is a "lecture" card, or not. The role played by the other brushes will become apparent from the subsequent description.

The input logic of the system comprises four flip flops 75–76, 77–78, 79–80, and 81–82. Flip-flop 75–76 is set by a logic 0 input signal applied to its terminal 75a. When it is set, the output on lines 83 goes to logic 0 and holds flip flop 75–76 in its set condition through feedback to flip flop terminal 75b. The logic 0 signal on line 83 simultaneously energizes a relay coil 84 to close a contact 84a so as to connect head 0 (one of the heads in the head array 57) to audio amplifier 85 via a normally closed switch 86. This permits information on the audio track associated with head 0 to be reproduced when the head is appropriately driven by head drive 61, with the information being reproduced either through speaker 35 and/or head phones 36.

In a similar manner NAND elements 77 and 78 are connected to form a flip flop operative to actuate head 1 of the head array; NAND's 79 and 80 control the operation of head 2; and NAND's 81 and 82 control the operation of head 3. By setting a particular one of these flip flops, therefore, a particular one of the audio tracks can be reproduced; and if the logic is such that the several input flip flop are set in sequence, the several audio tracks (e.g. on a "lecture" card) will similarly be reproduced in sequence.

It will be noted that the several input flip flops are so arranged that NAND elements 76, 78, 80 and 82 all have additional inputs, the arrangement being such that when any one of the four input flip flops is in its set condition the other three flip flops are reset. For example when flip flops 75–76 is set as the result of a logic 0 input to its terminal 75a, logic 0 inputs are simultaneously coupled to input terminals 78a, 80a, and 82a to reset the other three input flip flops. Normally, input terminals 75a, 77a, 79a and 81a are at logic 1 due to the current which flows through resistors 87, 88, 89, and 90 from the power supply termnial Vcc. If, however, the line connected to any of the input terminals 75a, 77a, 79a, or 81a is connected to zero volts (logic 0) the corresponding flip flop becomes set, the corresponding reading head is connected to the audio amplifier 85, and the other input flip flops are all reset to render their associated reading heads inoperative.

When a card first appears in the viewing position, the head 0 flip flop 75–76 is always set. The manner in which this is accomplished will be described subsequently. As a consequence, the audio track associated with head 0 is played when the head array 57 is appropriately translated. The set condition of the head 0 flip flop 75–76 causes brush 1 to be at logic 0. The circuit printed on the card 32 can connect this brush 1 to any of the brushes 4, 13 and/or 20. If, by way of example, brush 1 is connected to brush 4 by means of a printed circuit on the card then in the reading position, and if any one of reed switches SW1, SW2 or SW3 is closed by action of the magnetic pointer or wand 41, then a corresponding one of the brushes 2, 6 or 7 will also go to logic 0. Let us further assume that brush 2 is connected to brush 5 (designated "play 1") by means of a conductive deposit on the card; that brush 6 is connected to "play 2" brush 14; and that brush 7 is connected to "play 3" brush 21. With such an array of connections established by the printed circuits on the card, if reed switch SW1 is magnetically closed, input flip flop 77–78 will be set to reproduce the track associated with head 1; if switch SW2 is magnetically closed, input flip flop 79–80 will be set to reproduce the track associated with head 2; and if switch SW3 is magnetically closed, input flip flop 81–82 will be set to reproduce the track associated with head 3.

With the assumed series of card connections described above, therefore, after the first track is played on the card, the next track to be played will be determined by just which of the reed switches is closed by the student. It must be emphasized, however, that the card circuit can actually assume any arbitrary pattern desired, and any switch or choice point can be connected to any input flip flop brush. Furthermore, the brushes 1, 3, 12 and 19, which provide logic 0 signals when their associated flip flop is in its set condition, can be arbitrarily connected to any of the common brushes 4, 13 and 20 as may be desired to make any particular group or groups of switches active. By this arrangement, the actual logic function effected by the teaching machine depends entirely upon the conductive pattern on the card then in reading position, and this function can vary from card to card by appropriate changes in said conductive patterns. Naturally if a group of the reed switches does not have its common terminal connected by any conductive pattern to an active (logic 0) point, closure of any of the switches in that group will be without effect. In this way, for example, the switches SW1–SW0 can be rendered ineffective when a lecture card is in viewing position.

In addition to the brushes described above, a group of additional brushes 8, 9, and 10, termed the "exit" brushes, are provided to tell the logic to remove the card from its viewing position and to bring out the next card. A brush 17 termed "score" supplies an input to a mechanical counter 91, causing said counter to be incremented, for example, to accumulate a grade for the student by counting the number of correct responses. A brush 24 termed "repeat" causes the logic to return the program to head 0. The two brushes A and B, when interconnected by a corresponding conductive deposit on a card, informs the logic that a card is, in fact, in the viewing position. The brush C, termed "lecture," causes the logic to play all four tracks on the card in sequence, and then to remove the card from viewing position. The logical operations of these brushes, and of the overall system operation, will be further apparent from the subsequent description.

Let us assume that the teaching machine of FIG. 1 has been turned on and that the student or teacher has loaded a deck of cards 32 onto shelf 31. The switch 38 is then set to its "run" position. When the student is prepared to commence the teaching sequence, he touches "go" point 39 with the magnetic pointer 41 so as to close a magnetically responsive switch designated 39 in the logic diagram of FIG. 7. As shown in FIG. 7, when the switch 38 is moved to its "run" position a logic 0 input is removed from the reset side of a feed flip flop 92–93. Moreover, when the student closes "go" switch 39, a logic 0 input is supplied to NAND 93 of said flip flop 92–93 setting the feed flip flop; and this in turn energizes a relay 94 to close a contact 94a and supply drive to the card feed motor 55. Feeding of the card commences, and continues until a connection is established between the "card present" brushes A, B to signal that a first card is in viewing position. Completion of a connection between brushes A and B places a logic 0 signal on brush A, which signal is coupled via line 150 and switch 38 to reset flip flop 92–93.

Typically the first card in the stack will be a lecture card; and such a card will be provided with a printed conductor line extending between lecture brush C and grounded brush B. As a consequence, a logic 0 input will be supplied to gate elements 95 and 96 so as to enable those gates. The other inputs to these gates are derived from a "home-away" flip flop 97–98, the function of which will now be described.

Figure 4:
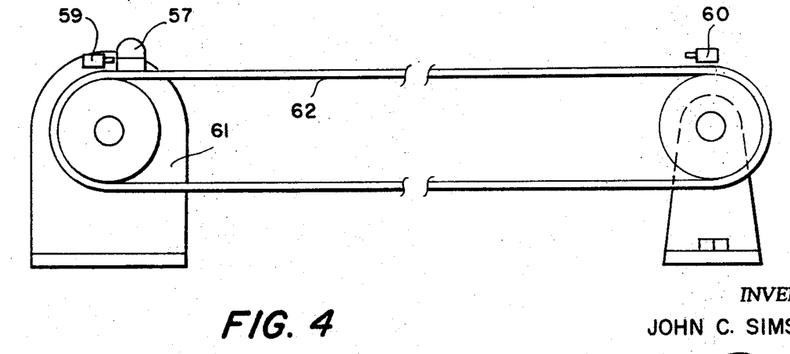
FIG. 4 is a diagrammatic view of the head drive mechanism employed in the teaching machine of the present invention.

As discussed in reference to FIG. 4, the head array 57 is associated with two limit switches 59 and 60 termed respectively the "home" and "away" switches. These switches are shown in the lower right corner of FIG. 7. When the head mechanism is "home," it is, by definition, at the start of the track associated with head 0. When it is "away," it is at the end of track 0. When the machine is first turned on, the head array 57 is moved automatically to its home position. This is accomplished by initially energizing both the card drive motor 55 and the head drive motor 61 to move the card drive picker arms 44 to a starting position, and to move the head assembly 57 to its home position, both as detected by appropriate relays in the power on-off circuit. This particular mechanism is not shown in FIG. 7, but can be readily supplied by those skilled in the art. With the head assembly 57 in the home position, limit switch 59 is closed to supply a logic 0 input to element 97 of "home-away" flip flop 97–98; and flip flop 97–98 is accordingly set to its "home" output state. Closure of limit switch 59 also supplies a reset input to element 99 of a "play" flip flop 99–100 to cause said play flip flop to initially be reset. The set condition of the flip flop 97–98 when the machine is first turned on, together with the fact that no card is yet in the viewing position when the machine is first turned on, qualifies gate 101 to place a logic 0 signal on line 102, and consequently on input terminal 75a of flip flop 75–76. As a result, when the machine is first turned on, the head 0 flip flop 75–76 is set and the other three input flip flops 77–78, 79–80, and 81–82 are reset.

When the "go" switch 39 is subsequently closed, and the card drive 55 actuated, a first card is fed into viewing position. It is assumed that this first card is a lecture card; and accordingly a connection is made via the printed circuit on that card between brushes B and C to place a logic 0 signal on line 103. This signal on line 103, together with the logic 1 signal which is also now present on lines 104 and 105 (from the outputs of logic elements 75 and 97 respectively) enables gate 106 to set play flip flop 99–100. The head drive motor 61, cooperating with the signal on "forward" line 105a (from the "home" side of flip flop 97–98) is accordingly energized to move the head array 57 in a "forward" direction over the sound tracks 66. When the head array 57 reaches the end of the tracks, it closes limit switch 60, setting flip flop 97–98 to its "away" position and resetting play flip flop 99–100 through capacitor 107.

The head assembly is now in its away position, and flip flop 97–98 is in a reset condition. This condition enables gate 108 via gate 96 to supply a logic 0 signal on line 109 to the set input terminal 77a of head 1 flip flop 77–78 whereby said flip flop 77–78 now assumes a set condition with the other input flip flops being reset. The reset condition of input flip flop 81–82 supplies a signal through OR gate 110 and AND gate 111 to again set the play flip flop 99–100. Since, at this time, flip flop 97–98 is in its "away" state, the changed signal on line 105a causes head drive motor 61 to rotate in the opposite direction; and the track associated with head 1 is accordingly now reproduced as the head array moves from its away position back to the home position.

When the head array 57 arrives at the home position, limit switch 59 is again closed, setting flip flop 97–98 and resetting play flip flop 99–100. This condition now enables AND gate 112 via gate 95, and gate 112 supplies a logic 0 signal via line 113 to the input terminal 79a of head 2 flip flop 79–80, while simultaneously resetting the other input flip flops. The track associated with head 2 will now be reproduced in a manner similar to that already described. At the end of this operation, the heads are in their "away" position and, by a sequence of operations entirely similar to that already described, the head 3 flip flop 81–82 will be set to activate head 3, and the head drive will again be energized to reproduce the track associated with head 3 during the return motion of head assembly 57. At the end of this operation, the head array will have returned to its home position.

As will be appreciated from the foregoing discussion, which describes the "lecture" mode of operation, the system operates to play all four tracks in sequence, and completes the operation with the head array 57 back in the home position. This operation is accomplished automatically by the logic shown in FIG. 7, simply by turning the equipment on and then causing a lecture card to be fed into viewing position to complete a circuit between brushes B and C.

It is, of course, necessary for the printed circuit on the back of the card to define for the logic just when the card then in viewing position should be removed and a new card brought into viewing position. This requirement applies, of course, whether the system is operating in the lecture mode, or in the so-called "response" mode. This criterion is accomplished by appropriate use of exit brushes 8, 9 and 10 associated with OR gate 115. A logic 0 signal applied to any one of brushes 8, 9 or 10 produces a signal on line 116 to a gate 117 so that when the head array arrives at its home position and line 105 goes to logic 1, the gate 117 supplies a logic 0 signal to set feed flip flop 92–93 and start the card drive motor 55. The drive thus removes the card then in the viewing area and brings a new card into position.

It should be noted that, in the logic provided by the system of FIG. 7, a new card can be brought into position only when the heads are in their "home" position. Thus, in the lecture mode of operation, the system can exit only after the track associated with either head 1 or head 3 is played. It will be obvious to those skilled in the art, however, that the system can be appropriately revised to allow an "exit" to take place after the playing of any track. To accomplish the exit operation, an appropriate printed circuit must be provided on the card to complete a connection between one of the exit terminals 8, 9 or 10 and any one of the brushes 1, 3, 12, or 19. This will cause the card to exit, and to be replaced by a new card, after the particular track in question has been played. As will be obvious from the subsequent description of the logical operations needed in the response mode of the system, multiple inputs to OR gate 115 are required to prevent back circuits on the card printed circuit from causing system malfunction.

In normal operation, the deck of cards 32 will start off with one or more lecture cards; and all such lecture cards will be fed in sequence into viewing position, and the audio information thereon automatically reproduced, in accordance with the operations described above. After the lecture information has been completely presented, however, a non-lecture or "response" card will be fed into viewing position. The visual information arranged on the upper face of such a card will ordinarily be disposed at different locations in a rectangular grid array of card sub-areas so that various pictures, words, or symbols relating to the previous lecture appear at a plurailty of the touch point locations 65 already described. In the response mode of operation, a first track on such a response card, corresponding to the track associated with head 0, must then be automatically played to tell the student that a choice is required, and to define the criteria for that choice. The system must then stop and wait for the student to make his selection by movement of the magnetic pointer 41 to the general area of one of the choice points corresponding to one of reed switches SW1–SW0.

To achieve this response mode of operation, the response cards do not have a conductive printed line on the card adapted to complete a circuit between lecture brush C and grounded brush B. As a consequence, and by a sequence of operations entirely similar to the start of the lecture mode, already discussed, the system operates to automatically reproduce the track associated with head 0 after a response card has been moved into position to complete a circuit between brushes A and B. However, neither the gate 108 nor the gate 112 will thereafter be enabled due to the absence of a logic 0 signal on line 103. Therefore the system will, in effect, stall after the track associated with head 0 is played.

There are several ways in which the system can be reactivated at this point. A first situation occurs when the student feels that he did not fully understand the question reproduced on track 0. If he wishes to hear this track again, the student may bring his magnetized pointer into proximity to point 40 (FIG. 1) thus closing magnetically responsive switch 40 (shown in the upper right corner of FIG. 7). Closure of switch 40 supplies a logic 0 signal to element 120 of repeat flip flop 120–121 so as to set that flip flop. When flip flop 120–121 is set, it operates through relay coil 122 to open normally closed switch 86 thereby disabling the input to audio amplifier 85. At the same time, a signal is applied from the output of element 121 to the input of element 110 to set play flip flop 99–100 thereby causing the head array 57 to move back to its home position. The output signal from element 120 of repeat flip flop 120–121 is also coupled via line 123 to the input of a gate 124; and this input together with the "home" signal applied via line 105 supplies a logic 0 signal on line 102 to assure that head 0 flip flop 75–76 remains in its set condition. Accordingly, for this assumed sequence of operation, the track associated with head 0 will be replayed.

Whether or not the student elects to hear the track 0 audio again, he must eventually make a choice by bringing his magnetized pointer into close proximity to a particular choice point on the upper surface of the card. Such action will close one of the reed switches SW1–SW0. Closure of an appropriate switch will then institute a sequence of operation of the type described earlier in reference to the several switches SW1–SW0, i.e., a signal will be supplied from the brush associated with the activated switch to one of the play brushes 5, 14 or 21. The printed circuit on the card then in viewing position will, of course, be set up so that if a correct choice is made, the track then played will reproduce a message giving appropriate positive reinforcement; and, if desired, a conductive line on the card can also supply a signal to score brush 17 to register the correct response on counter 91. On the other hand, if an incorrect response is made, closure of this incorrect switch will supply a signal to the input flip flop associated with the appropriate track giving a negative reinforcement message. In either case, after the message resulting from the student's choice has been reproduced, a further conductive line on the card, extending between the appropriate one of brush contact points 3, 12, or 19 to one of exit terminals 8, 9, or 10 will cause the feed flip flop 92–93 to be set after the selected track has been reproduced, so as to feed a new card into position.

Another repeat situation may occur when a student makes a choice which is almost correct but which the author of the instruction program would like to ask the student to try again. In such a situation, a particular choice may select an audio track which reproduces a message telling the student that his choice is not quite right, and why, and asking him to reconsider his choice. Upon conclusion of the playing of such a track, an appropriate conductive line on the card can supply a signal to repeat brush 24 which in turn supplies a signal via inverter 130 and gate 131 to repeat flip flop 120–121. The repeat flip flop will accordingly be set, and will cause the track associated with head 0 to be replayed; but in this case the track is replayed only after a reinforcement track has been played first.

The logic of the present invention may also include the necessary elements to permit the program to branch; and the additional elements needed to accomplish this function are shown in FIG. 8. For this function four additional brushes 26–29 are needed. Brushes 37 ("Branch to 1") and 28 ("branch to 2") can be connected by the printed circuit on the card so that either a flip flop 135–136 or a flip flop 137–138 will be set if a particular choice point is activated. The set condition of either flip flop, as sensed by OR gate 139, will provide an enabling input to gate 140. A second input to said gate 140 is derived from line 105b coupled to the output of element 97 in the home-away flip flop 97–98. As a consequence, when the head array is home and an appropriate signal is applied to line 105b, a feed signal is generated on line 93a to set feed flip flop 92–93. The feed flip flop 92–93 will be held in this set condition as long as either flip flop 135–136 or flip flop 137–138 remains set.

Brushes 26 ("reset 1") and 29 ("reset 2") sense each card as it is fed from the input stack into viewing position. If the card in viewing position has a conductive line on it completing a circuit from grounded brush B to brush 26, the flip flop 135–136 will be reset. However if the card in viewing position has a conductive line completing a circuit from grounded brush B to brush 29, flip flop 137–138 will be reset. As mentioned earlier, as long as either flip flop is set, cards will feed continually; and therefore once one of the branch flip flops becomes set, cards will move through the machine until a particular card appears having an appropriate conductive line operative to reset the set flip flop. In this way, the program can, as a result of a first particular response, branch forward to a first particular card; and, as a result of a second particular response, the system can branch forward to a second particular card. By this operation, the student response can automatically cause the machine to present remedial information or, when the response is of a different nature, the machine can move forward to a different subject.

While I have thus described a preferred embodiment of the present invention, many variations will be suggested to those skilled in the art. It must therefore be emphasized that the foregoing description is intended to be illustrative only and not limitative of my invention; and all such variations and modifications as are in accord with the principles described are meant to fall within the scope of the appended claims.

Having thus described my invention, I claim:

1. A unitary card for the presentation of information comprising a single piece of card stock having a first generalized area bearing visual information, at least one reproducible sound track disposed in a second generalized area on said single piece of card stock and having audio information recorded on said track related to the visual information in said first generalized area, and control information disposed in a third generalized area on said single piece of card stock, said control information comprising sensible means defining a logical relationship between said visual information and said reproducible audio information.

2. The unitary card of claim 1 wherein said first generalized area is located on one surface of said single piece of card stock, at least one of said second and third generalized areas being located on the surface of said piece of card stock opposite to said one surface.

3. The unitary card of claim 1 wherein the control information on said piece of card stock comprises a plurality of spaced points located in said third generalized area, said sensible means comprising conductive circuits carried by said piece of card stock and interconnecting selected ones of said spaced points.

4. The unitary card of claim 3 wheerin said reproducible sound track comprises a plurality of magnetic tracks.

5. The unitary card of claim 4 wherein said audio information is recorded on said magnetic tracks as a variable area recording.

6. The unitary card of claim 1 wherein said first generalized area is subdivided into a rectangular grid array of sub-areas respectively bearing different visual information.

7. The unitary card of claim 1 wherein said piece of card stock comprises an opaque paper stock, said visual information, audio information, and control information all comprising material printed on said paper stock.

8. A teaching machine comprising means for receiving a plurality of unitary teaching cards each of which comprises a single piece of card stock having visual material, reproducible audio information, and sensible control information thereon, means for feeding each of said unitary cards in sequence into a viewing position for individual direct viewing of the visual material on each said card, audio reproducing means in said machine, and sensing means in said machine responsive to the presence of a card in said viewing position and also responsive to the control information on said card then in said viewing position for controlling said reproducing means to effect reproduction of at least a portion of the audio information on said card then in said viewing position.

9. The apparatus of claim 8 wherein said control information comprises conductive printed circuit means on each of said pieces of card stock, said sensing means including a plurality of spaced electrical contact points in said machine engaging the printed circuit means on the piece of card stock comprising the card then in said viewing position.

10. The apparatus of claim 8 wherein the visual information on at least one of said cards is distributed across a surface of said card in an array of spaced locations, control means including a plurality of magnetically sensitive switches distributed in said machine in an array corresponding to and respectively disposed adjacent to said card array of spaced locations when said card is in said viewing position, and magnetic means manually movable relative to said card array of spaced locations for activating selected ones of said magnetically sensitive switches.

11. The apparatus of claim 8 wherein said reproducible audio information is disposed in a plurality of separate tracks on each of said cards, said reproducing means comprising a plurality of transducers positioned adjacent said plurality of tracks respectively when the card is in said viewing position, and control means in said machine coupled to said sensing means for rendering different ones of said transducers operative to reproduce different ones of said tracks in a sequence determined at least in part by said control information on the card then in said viewing position.

12. The apparatus of claim 11 including means for moving said plurality of transducers as a group in two opposing directions, said control means including means for rendering different ones of said transducers operative during different directions of movement of said group of transducers thereby to reproduce different ones of said tracks during both of said opposing directions of transducer movement.

13. The teaching machine of claim 8 wherein said sensible control information comprises different information on different ones of said unitary cards, and control means responsive to the sensing of control information of a first type on one of said unitary cards for reproducing all of the audio information on said one card, and responsive to the sensing of control information of a second type on a different one of said unitary cards for reproducing only a portion of the audio information on said different card.

14. The teaching machine of claim 8 wherein said sensible control information appears at different locations on different ones of said unitary cards, said sensing means being responsive to the location of said control information on each of said unitary cards, and means coupled to said sensing means for performing any one of a plurality of different control operations dependent respectively upon the location of the control information on the unitary card then in viewing position.

References Cited

UNITED STATES PATENTS

| | | | |
|---|---|---|---|
| 3,100,352 | 8/1963 | Boissevain | 35—9 |
| 3,353,280 | 11/1967 | Emde | 35—9 |
| 3,363,330 | 1/1968 | Kobler | 35—9 |
| 3,383,781 | 5/1968 | Diuzet | 35—9 |
| 3,396,478 | 8/1968 | Genin. | |

WILLIAM H. GRIEB, Primary Examiner